(12) United States Patent
Kim et al.

(10) Patent No.: US 8,948,281 B2
(45) Date of Patent: Feb. 3, 2015

(54) METHOD AND APPARATUS FOR SCHEDULING IN MULTIPLE-INPUT MULTIPLE-OUTPUT COMMUNICATION SYSTEM

(75) Inventors: Eun-Yong Kim, Hwaseong-si (KR); Eun-Seok Ko, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 491 days.

(21) Appl. No.: 13/011,603

(22) Filed: Jan. 21, 2011

(65) Prior Publication Data

US 2011/0182375 A1  Jul. 28, 2011

(30) Foreign Application Priority Data

Jan. 22, 2010  (KR) .................. 10-2010-0006016

(51) Int. Cl.
  *H04L 27/28* (2006.01)
  *H04W 72/04* (2009.01)
  *H04L 5/00* (2006.01)
  *H04W 72/12* (2009.01)

(52) U.S. Cl.
  CPC ......... *H04W 72/0426* (2013.01); *H04L 5/0023* (2013.01); *H04L 5/0091* (2013.01); *H04W 72/046* (2013.01); *H04W 72/1231* (2013.01)
  USPC ........... 375/260; 370/330; 709/224; 455/450; 455/501

(58) Field of Classification Search
  CPC .............. H04L 5/0023; H04L 5/0091; H04W 72/0426; H04W 72/046; H04W 72/1231
  USPC ........... 375/260; 370/330; 709/224; 455/450, 455/501
  See application file for complete search history.

(56) References Cited

U.S. PATENT DOCUMENTS

| | | | |
|---|---|---|---|
| 2009/0296650 A1* | 12/2009 | Venturino et al. | 370/330 |
| 2010/0106828 A1* | 4/2010 | Palanki et al. | 709/224 |
| 2010/0113099 A1* | 5/2010 | Uno et al. | 455/562.1 |
| 2010/0239036 A1* | 9/2010 | Koo et al. | 375/260 |

OTHER PUBLICATIONS van Rensburg, C.; Hosein, P., "Interference Coordination through Network-Synchronized Cyclic Beamforming," Vehicular Technology Conference Fall (VTC 2009-Fall), 2009 IEEE 70th , vol., No., pp. 1,5, Sep. 20-23, 2009 URL: http://ieeexplore.ieee.org/stamp/stamp.jsp?tp=&arnumber=5378821&isnumber=5378665.*

* cited by examiner

*Primary Examiner* — Kenneth Lam
*Assistant Examiner* — Ross Varndell

(57) ABSTRACT

In a Multiple-Input Multiple-Output (MIMO) communication system, a serving evolved Node B (eNB) receives a channel covariance matrix of the serving eNB and a channel covariance matrix for a first neighbor eNB with the highest interference among neighbor eNBs, from a User Equipment (UE). Received signal power information is generated for each subband-beam pair. Interference signal power information is generated for each subband-beam pair for the first neighbor eNB. The generated interference signal power information is exchanged with the first neighbor eNB for each subband-beam pair. Beam coordination information indicating a use status of each beam in each subband is generated for the UE, using the interference signal power information of the first neighbor eNB. The generated beam coordination information is exchanged with the neighbor eNB. Scheduling is performed on the UE using the generated beam coordination information and the beam coordination information of the first neighbor eNB.

20 Claims, 5 Drawing Sheets

METHOD AND APPARATUS FOR SCHEDULING IN MULTIPLE-INPUT MULTIPLE-OUTPUT COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Jan. 22, 2010 and assigned Serial No. 10-2010-0006016, the entire disclosure of which is hereby incorporated by reference.

TECHNICAL FIELD OF THE INVENTION

The present invention relates to a method and apparatus for scheduling in a Multiple-Input Multiple-Output (MIMO) communication system.

BACKGROUND OF THE INVENTION

In general, compared with a single-antenna cellular system, a MIMO communication system improves in system performance and increases in efficiency of a bandwidth and the like.

Conventionally, a Fractional Frequency Reuse (FFR) technology, an Inter-Cell Interference Coordination (ICIC) technology, and such, have been used as a technology for reducing inter-cell interference. These technologies reduce inter-cell interference by controlling transmit power.

Recently, however, technologies for more effectively controlling interference through more active collaboration between base stations (or Node Bs) have been proposed. In 3rd Generation Partnership Project (3GPP) Long Term Evolution-Advanced (LTE-A) and Institute of Electrical and Electronics Engineers (IEEE) 802.16m, which are two major standard organizations for the next-generation mobile communication, base station collaboration technologies such as a Coordinated Multiple Point Transmission/Reception (CoMP) technology and a Multi-BS MIMO technology are under active discussion, respectively. To reduce inter-cell interference, these base station collaboration technologies include not only a technology of controlling transmit power but also a technology of controlling a spatial domain through antenna processing.

Meanwhile, the CoMP technology used in a downlink includes a Joint Processing (JP) technology and a Coordinated Scheduling/Beamforming (CS/CB) technology. The JP technology is a technology for allowing collaborative base stations to operate as if they are one base station, by sharing traffic data with each other. The CS/CB technology is a technology for allowing collaborative base stations to share scheduling-related information and channel information with each other without sharing traffic data, thereby reducing inter-cell interference.

The JP technology and the CS/CB technology will be described in detail below with reference to FIG. 1.

FIG. 1 illustrates an example of a MIMO communication system using a multi-cell technology.

Referring to FIG. 1, a MIMO communication system includes a first evolved Node B (eNB) 100, a second eNB 110, and first to sixth User Equipments (UEs) 101 to 106.

If the MIMO communication system uses the JP technology, the first and second eNBs 100 and 110, as collaborative eNBs, share traffic data with each other. By sharing traffic data with each other, the first and second eNBs 100 and 110 operate as if they are one eNB. In this situation, all antennas of the first and second eNBs 100 and 110 are used, and data may be transmitted to the first to sixth UEs 101 to 106 via all the antennas.

Alternatively, if the MIMO communication system uses the CS/CB technology, the first and second eNBs 100 and 110 do not share traffic data with each other. Instead, the first and second eNBs 100 and 110 share scheduling-related information, channel information and the like, thereby preventing occurrence of interference between the first and second eNBs 100 and 110.

A Precoder Matrix Index (PMI) restriction technology belonging to the CS/CB technology will be described below with reference to FIG. 2.

FIG. 2 illustrates an example of a MIMO communication system using a PMI restriction technology.

Referring to FIG. 2, a MIMO communication system includes a first eNB 200, a second eNB 210, a first UE 201 performing communication with the first eNB 200, and second to fourth UEs 202 to 204 performing communication with the second eNB 210.

The third UE 203 located in an overlapping cell coverage area between the first and second eNBs 200 and 210, determines whether interference from the first eNB 200 is greater than or equal to a threshold due to use of a precoder. If the interference from the first eNB 200 is greater than or equal to the threshold, the third UE 203 requests the first eNB 200 not to use a PMI that is causing powerful interference to the third UE 203. The third UE 203 transmits the request through the second eNB 210 which is its serving eNB. If the first eNB 200 does not use the PMI in response to this request, interference between a cell of the first eNB 200 and a cell of the second eNB 210 is reduced, contributing to an increase in a Signal-to-Interference and Noise Ratio (SINR) in the third UE 203.

Meanwhile, another technology related to the CS/CB technology includes a PMI recommendation technology. Unlike the above-described PMI technology, the PMI recommendation technology requests a neighbor eNB to use a specific PMI capable of reducing interference, thereby reducing inter-cell interference.

A macro diversity technology and a multi-cell Zero-Forcing Beamforming (ZFBF) technology related to the JP technology will be described below with reference to FIGS. 3 and 4, respectively.

FIG. 3 illustrates an example of a MIMO communication system using a macro diversity technology.

Referring to FIG. 3, a MIMO communication system includes a first eNB 300, a second eNB 310, a first UE 301, and a second UE 302.

If the MIMO communication system uses a macro diversity technology, the first and second eNBs 300 and 310 transmit data only to the second UE 302 out of the first and second UEs 301 and 302, which are located in the same overlapping cell coverage area between the first and second eNBs 300 and 310. That is, in the MIMO communication system including multiple cells, as traffic data is shared between eNBs, only one UE out of multiple UEs that are located in the same overlapping coverage area may receive data at a time. Therefore, when the macro diversity technology is used, spectral efficiency is decreased disadvantageously, but it is possible to reduce interference and increase signal strength desirably because an interference channel is used as an effective signal channel.

FIG. 4 illustrates an example of a MIMO communication system using a multi-cell ZFBF technology.

Referring to FIG. 4, a MIMO communication system includes a first eNB 400, a second eNB 410, a first UE 401, and a second UE 402.

If the MIMO communication system uses a multi-cell ZFBF technology, the first and second eNBs 400 and 410 may transmit data to both the first and second UEs 401 and 402. The first and second eNBs 400 and 410 are adapted to reduce inter-cell interference by using downlink channel information.

If the PMI restriction technology or the PMI recommendation technology belonging to the CS/CB technology among the above inter-cell interference reducing technologies is actually used for a scheduler, various problems may occur. For example, when the PMI restriction technology or the PMI recommendation technology is used, (i) an eNB should determine from which UE it should receive a request to effectively reduce inter-cell interference when a plurality of UEs send different requests, (ii) an eNB should determine from which eNB it should receive a request to effectively reduce inter-cell interference when requests are received from a plurality of eNBs; or (iii) an eNB should determine whether its cell capacity is reduced if it receives a request from an eNB or a UE. Due to the above operation of an eNB, the number of UEs obtaining a gain may be limited.

Meanwhile, when the macro diversity technology among the JP technologies is used, eNBs of a plurality of cells transmit data only to one UE in an overlapping coverage area, making it impossible to acquire higher capacity compared with the single-cell technology in which Multi-User (MU)-MIMO is introduced. When the multi-cell ZFBF technology among the JP technologies is used, high capacity is acquired theoretically, but disadvantageously, the performance may degrade due to the inaccurate channel information and the latency, and the complexity may increase due to the scheduler integration. In order for these JP technologies to be used, because a cluster for inter-eNB collaboration should be fixed, there is a limitation in improving the capacity of a UE located in a boundary of the cluster.

SUMMARY OF THE INVENTION

To address the above-discussed deficiencies of the prior art, it is a primary object to provide at least the advantages described below. Accordingly, an aspect of the embodiments of the present invention is to provide a method and apparatus for scheduling in a Multiple-Input Multiple-Output (MIMO) communication system.

Another aspect of the embodiments of the present invention is to provide a method and apparatus capable of effectively performing beam coordination through information exchange between eNBs in a MIMO communication system.

Another aspect of the embodiments of the present invention is to provide a method and apparatus for effectively controlling interference without a significant amount of modifications to an existing scheduler in a MIMO communication system.

In accordance with one aspect of the present invention, there is provided a method for scheduling by a serving evolved Node B (eNB) in a Multiple-Input Multiple-Output (MIMO) communication system. The method includes receiving, from a User Equipment (UE), a channel covariance matrix for the serving eNB and a channel covariance matrix for a first neighbor eNB with the highest interference among a plurality of neighbor eNBs. Received signal power information is received for each subband-beam pair. Interference signal power information is generated for each subband-beam pair for the first neighbor eNB. The generated interference signal power information is exchanged for interference signal power information of the first neighbor eNB for each subband-beam pair. Beam coordination information indicating a use status of each beam in each subband is generated for the UE, using the interference signal power information of the first neighbor eNB. The generated beam coordination information is exchanged for beam coordination information of the first neighbor eNB. And scheduling is performed on the UE using the generated beam coordination information and the beam coordination information of the first neighbor eNB.

In accordance with another aspect of the present invention, there is provided an apparatus for scheduling by a serving evolved Node B (eNB) in a Multiple-Input Multiple-Output (MIMO) communication system. The apparatus includes a receiver for receiving a channel covariance matrix for the serving eNB and a channel covariance matrix for a first neighbor eNB with the highest interference among a plurality of neighbor eNBs, from a User Equipment (UE). An eNB interface communicates with the first neighbor eNB. And a controller, upon receipt of the channel covariance matrix for the serving eNB and the channel covariance matrix for the first neighbor eNB, generates received signal power information for each subband-beam pair, generates interference signal power information for each subband-beam pair for the first neighbor eNB, controls the eNB interface to exchange the generated interference signal power information for interference signal power information of the first neighbor eNB for each subband-beam pair, generates beam coordination information indicating a use status of each beam in each subband for the UE, using the interference signal power information of the first neighbor eNB, controls the eNB interface to exchange the generated beam coordination information for beam coordination information of the first neighbor eNB, and performs scheduling on the UE using the generated beam coordination information and the beam coordination information of the first neighbor eNB.

In accordance with yet another aspect of the present invention, there is provided a serving evolved Node B (eNB) in a Multiple-Input Multiple-Output (MIMO) communication system. The serving eNB includes a receiver, an eNB interface, and a controller. The receiver receives signals from a user equipment (UE). The eNB interface communicates with a plurality of neighbor eNBs. The controller is communicatively coupled to the receiver and the eNB interface and controls the scheduling process in the eNB. To that end, the controller determines a first neighbor eNB with the highest interference among the plurality of neighbor eNBs based on a signal received from the UE, generates interference signal power information for the first neighbor eNB for each subband-beam pair, exchanges the generated interference signal power information with the first neighbor eNB to receive interference signal power information generated from the first neighbor eNB for each subband-beam pair, generates beam coordination information indicating a beam use status for each beam in each subband for the UE, using the interference signal power information received from the first neighbor eNB, exchanges the generated beam coordination information with the first neighbor eNB to receive beam coordination information generated from the first neighbor eNB, and performs scheduling on the UE using the generated beam coordination information and the received beam coordination information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. In the following description, specific details such as detailed configuration and components are merely provided to assist the overall understanding of the embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

A method and apparatus for effectively reducing inter-cell interference through information exchange between eNBs in a downlink of a Multiple-Input Multiple-Output (MIMO) communication system is proposed in the present disclosure. To be specific, the present disclosure presents a method and apparatus in which information to be exchanged between eNBs on a subband basis is generated at intervals of a preset long-term period, beam coordination information is generated in each eNB based on the information to be exchanged between eNBs, the generated beam coordination information is used for scheduling, and each eNB adaptively updates a beam coordination scheme.

Figure 1:
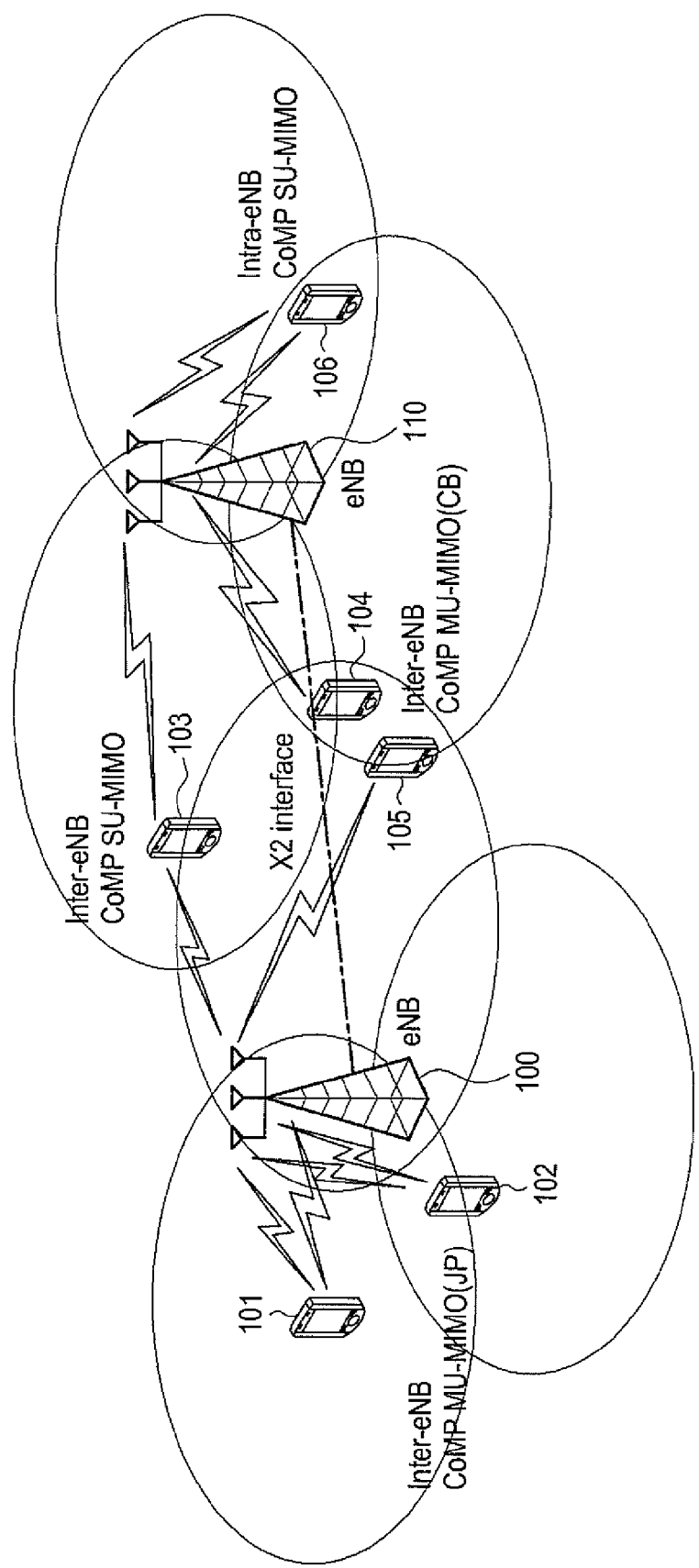
FIG. 1 illustrates an example of a MIMO communication system using a multi-cell technology, according to the principles of the present disclosure.
Figure 2:
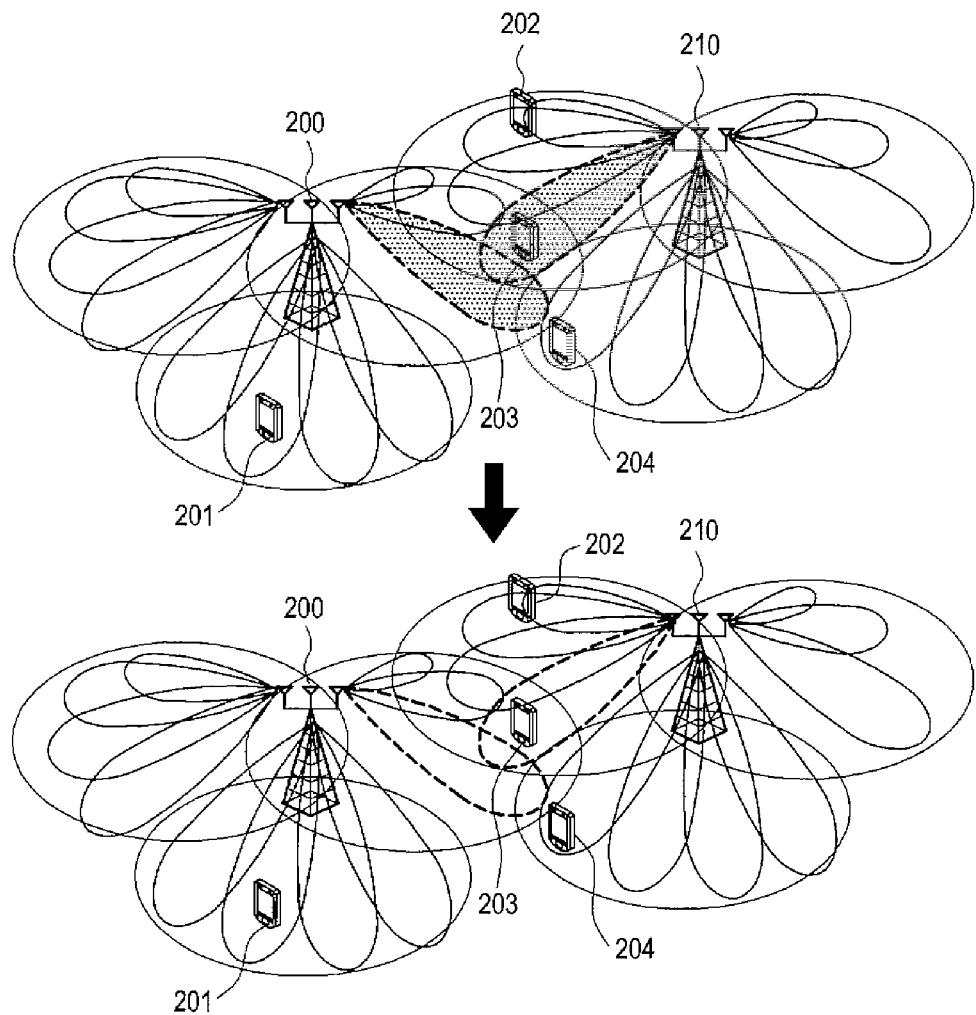
FIG. 2 illustrates an example of a MIMO communication system using a PMI restriction technology, according to the principles of the present disclosure.
Figure 3:
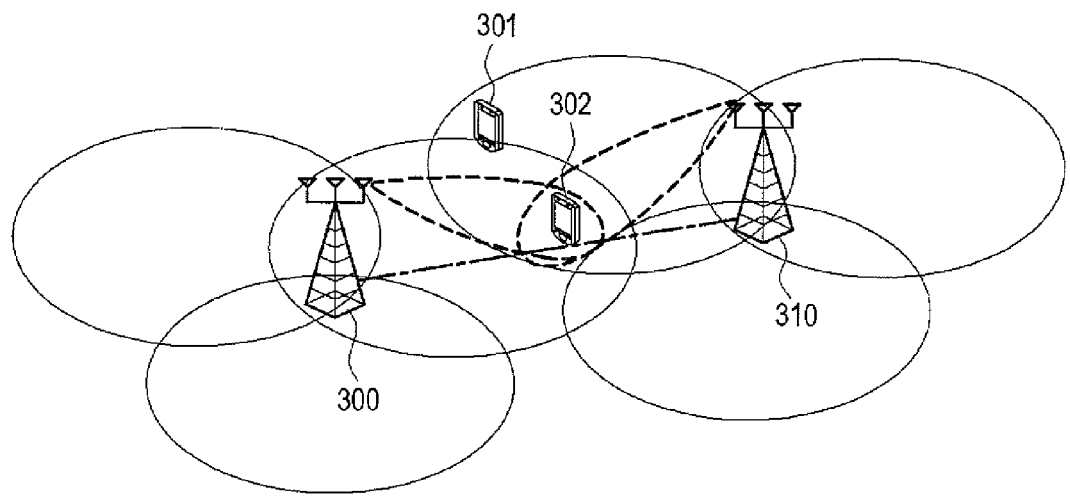
FIG. 3 illustrates an example of a MIMO communication system using a macro diversity technology, according to the principles of the present disclosure.
Figure 4:
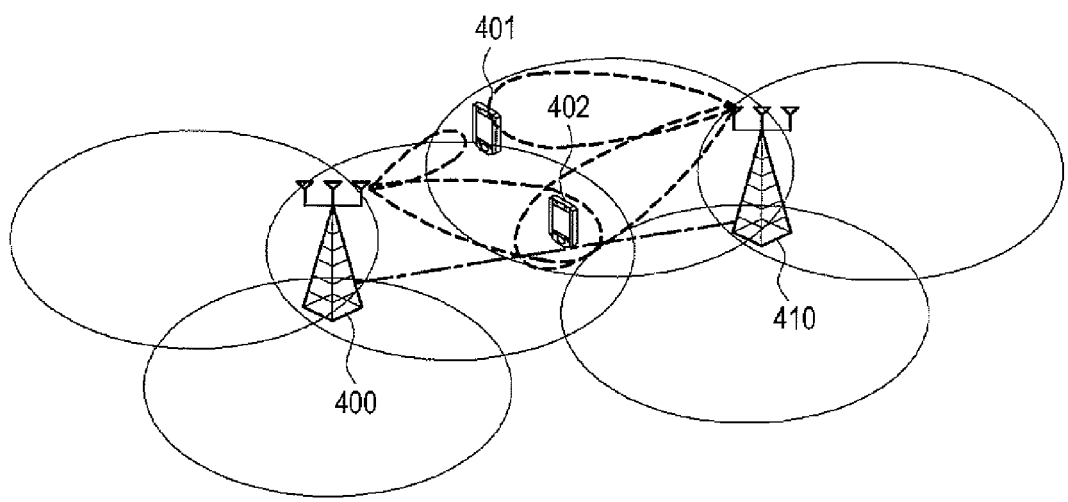
FIG. 4 illustrates an example of a MIMO communication system using a multi-cell ZFBF technology, according to the principles of the present disclosure.

A MIMO communication system according to an embodiment of the present invention is similar in configuration to the MIMO communication system illustrated in FIG. 1. That is, the MIMO communication system according to an embodiment of the present invention includes a plurality of eNBs and a plurality of UEs, and cell areas covered by the plurality of eNBs are adjacent to each other. Hence, a signal transmitted from one eNB may serve as interference to a UE receiving a signal from another eNB. As such, an operation of an eNB adapted to minimize such inter-cell interference will be described below. While an operation of a serving eNB for a UE in a specific cell will be described herein by way of example, the operation of a serving eNB in an embodiment may be performed by other neighbor eNBs adjacent to the serving eNB.

A scheduling method by a serving eNB in a MIMO communication system according to an embodiment of the present invention will be described below with reference to FIG. 5.

Figure 5:
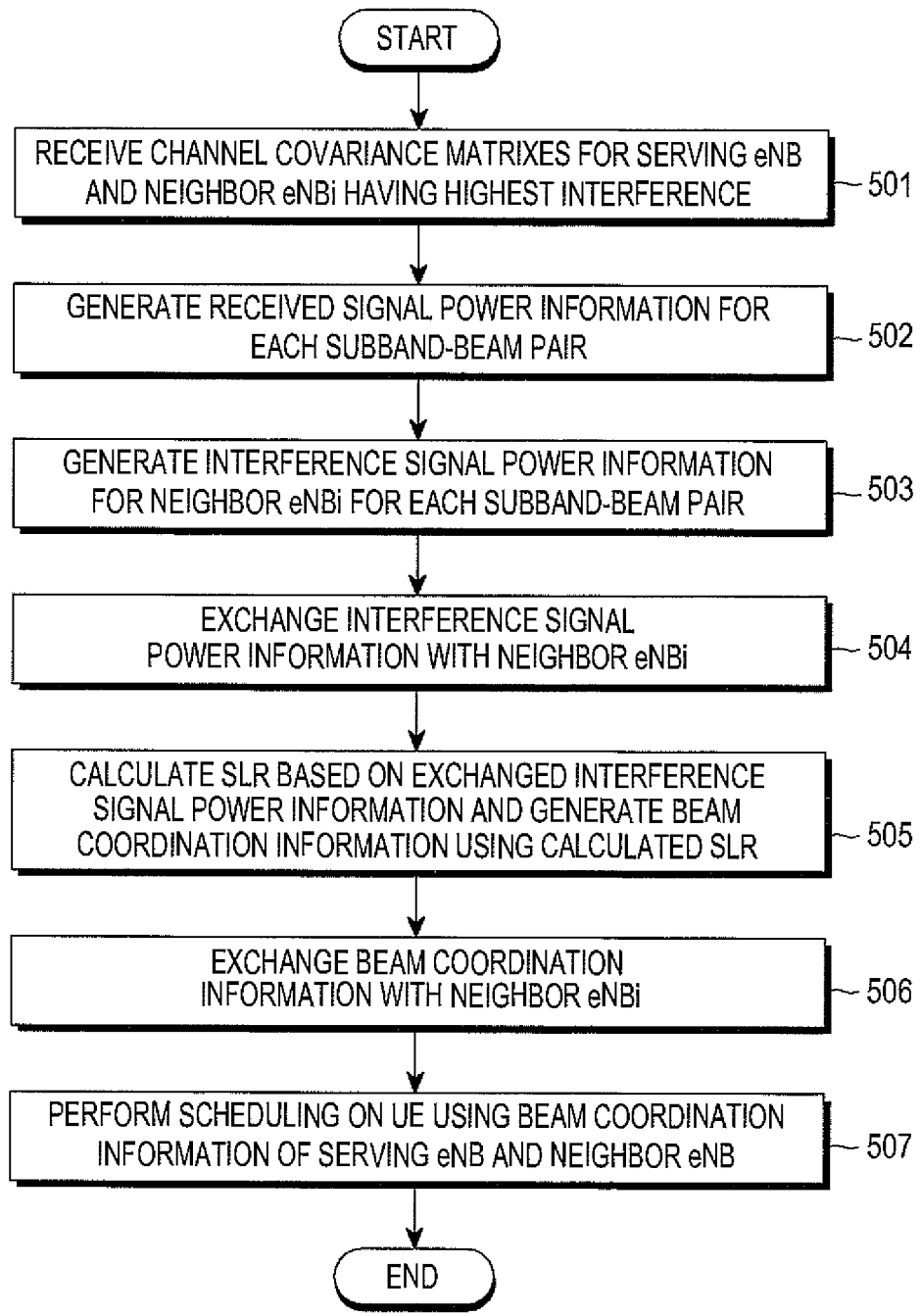
FIG. 5 illustrates a scheduling process by a serving eNB in a MIMO communication system according to an embodiment of the present invention.

FIG. 5 illustrates a scheduling process by a serving eNB in a MIMO communication system according to an embodiment of the present invention.

Referring to FIG. 5, in block 501, a serving eNB receives channel covariance matrixes for the serving eNB and a neighbor eNBi with the highest interference in power among a plurality of neighbor eNBs from a UE in its cell.

The serving eNB generates received signal power information for each subband-beam pair in block 502, and generates interference signal power information for the neighbor eNBi for each subband-beam pair in block 503.

Subsequently, the serving eNB exchanges the interference signal power information with the neighbor eNBi in block 504. In block 505, the serving eNB calculates a Signal-to-Leakage Ratio (SLR) based on the exchanged interference signal power information, and generates beam coordination information indicating use/nonuse of each beam in each subband depending on the calculated SLR.

After generating the beam coordination information, the serving eNB exchanges the beam coordination information with the neighbor eNBi in block 506, and performs scheduling on the UE using at least one of beam coordination information of the serving eNB and beam coordination information of the neighbor eNBi in block 507.

As illustrated in FIG. 5, the scheduling process presented by an embodiment of the present invention includes seven steps. The seven steps corresponding to blocks 501 to 507 in FIG. 5, respectively, will be described in detail below.

Block 501

By estimating a downlink channel, each UE calculates channel covariance matrixes for a serving eNB and a neighbor eNBi with the highest interference in power among a plurality of neighbor eNBs, and transmits the calculated channel covariance matrixes to the serving eNB.

The channel covariance matrixes for the serving eNB and the neighbor eNBi with the highest interference in power are calculated using Equation 1 below.

$R_{k0}{}^m = H_{k0}{}^{m^H} H_{k0}{}^m$, for serving eNB $R_{ki}{}^m = H_{ki}{}^{m^H} H_{ki}{}^m$, for neighbor eNBi [Eqn. 1]

where k represents an index of a UE, i represents an index of a neighbor eNBi with the highest interference, m represents an index of a subband, $R_{k0}{}^m$ represents a channel covariance matrix of a serving BS for a UE k in a subband m, $R_{ki}{}^m$ represents a channel covariance matrix of the neighbor eNBi for the UE k in the subband m, $H_{k0}{}^m$ represents a channel matrix between the serving eNB and the UE k in the subband m, $H_{ki}{}^m$ represents a channel matrix between the neighbor eNBi and the UE k in the subband m, $H_{k0}{}^{m^H}$ represents a Hermitian matrix of $H_{k0}{}^m$, and $H_{ki}{}^{m^H}$ represents a Hermitian matrix of $H_{ki}{}^m$.

An index of the serving eNB is assumed herein as '0'.

The reason why each UE calculates a channel covariance matrix for the neighbor eNBi with the highest interference in power among the plurality of neighbor eNBs is because interferences from many cells are not simultaneously high due to the sector antenna pattern and the antenna vertical tilting.

In contrast to Frequency Division Duplex (FDD), a serving eNB in Time Division Duplex (TDD) may directly calculate a channel covariance matrix by receiving a sounding signal, or a neighbor eNBi with the highest interference may directly calculate a channel covariance matrix for a UE and deliver it to a serving eNB of the UE.

Block 502

In Block 502, the serving eNB quantizes a spatial domain using a predetermined rank-1 codebook. For example, when quantizing a spatial domain into N beams, the serving eNB calculates received power of a desired signal for each subband-beam pair using Equation 2 below.

$$\prod_{k}^{user} \left( \|H_{0m}^k v_j\|^2 P_{Tx} \right)^{\frac{\phi_{km}^{(0)}}{T_k}} \quad [\text{Eqn. 2}]$$

where $H_{0m}^k$ represents a downlink channel matrix between a serving eNB and a UE k in a subband m, $v_j$ represents a precoding vector of a j-th beam, $P_{Tx}$ represents a transmit power of a serving eNB in a subband m, $\Phi_{km}^{(0)}$ represents a ratio in which a UE k is allocated a subband m from a serving eNB, and $T_k$ represents a throughput of a UE k.

If the serving eNB calculates this received power for all subband-beam pairs, an M×N matrix is determined, where M is the number of subbands and N is the number of beams. The determined matrix, a received power matrix of a serving eNB, may be represented as $A_{00}$, and the serving eNB generates received signal power information using $A_{00}$.

Block 503

The serving eNB generates interference signal power information of the neighbor eNBi for each subband-beam pair. For the neighbor eNBi, the serving eNB calculates a matrix for a power of an interference signal received by its UE using Equation 3 below, for each subband-beam pair.

$$\prod_{k}^{user} \left( \|H_{im}^k v_j\|^2 P_{Tx} \right)^{\frac{\phi_{km}^{(0)}}{T_k}} \quad [\text{Eqn. 3}]$$

where $H_{im}^k$ represents a downlink channel matrix between a neighbor eNBi and a UE k in a subband m. Similar to Block 502, if interference signal power is calculated for all subband-beam pairs, an M×N matrix is determined. The determined matrix is represented as $A_{0i}$, and the serving eNB generates interference signal power information using $A_{0i}$.

Block 504

The serving eNB exchanges the interference signal power information generated in Block 504 with the neighbor eNBi. That is, the serving eNB transmits interference signal power information with $A_{0i}$ included in it, to the neighbor eNBi, and receives interference signal power information with $A_{i0}$ included in it, from the neighbor eNBi. An exchange of the interference signal power information may be performed for a period that is longer than a period for which scheduling for a UE is performed. For example, the period may be 100-200 ms.

Block 505

The serving eNB calculates an SLR based on the interference signal power information it has exchanged with the neighbor eNBi. To be specific, the serving eNB calculates an SLR thereof using Equation 4 below.

$$SLR_0 = \frac{A_{00}}{\prod_{i \neq 0} A_{i0}} \quad [\text{Eqn. 4}]$$

where $SLR_0$ represents an SLR of the serving eNB, and both the multiplication and division applied to the matrix represent element-wise functions.

By maximizing the SLR calculated using Equation 4, a Proportional Fairness (PF) metric of the entire network is maximized. PF scheduling, for providing proportional fairness in a downlink, ensures the maximum long-term throughput of UEs whose wireless channel states are relatively better than an average.

However, because the present invention is not to search for beams maximizing an SLR, but rather to effectively control inter-cell interference through minimum information exchange between eNBs, use/nonuse of each beam is determined based on the SLR, for each subband. That is, if an SLR is greater than or equal to a threshold γ for each subband-beam pair, the serving eNB uses the pertinent beam, and if the SLR is less than the threshold γ, the serving eNB determines not to use the beam.

Table 1 below shows availability of each beam in each subband according to an embodiment of the present invention.

TABLE 1

|  |  | Beam$_1$ | Beam$_2$ | Beam$_3$ | Beam$_4$ | ... | Beam$_N$ |
|---|---|---|---|---|---|---|---|
| $B_0$ = | Subband 1 | 1 | 1 | 1 | 0 | ... | 0 |
|  | Subband 2 | 1 | 1 | 1 | 1 | ... | 1 |
|  | Subband 3 | 1 | 1 | 1 | 1 | ... | 1 |
|  | ... |  |  |  |  | ... |  |
|  | Subband M | 0 | 0 | 1 | 1 | ... | 1 |

In Table 1, $B_0$ represents beam coordination information determined in the serving eNB, '1' represents use of a specific beam in a pertinent subband, and '0' represents nonuse of a specific beam in a pertinent subband. For example, it is shown in Table 1 that beams #1 to #3 are used and beams #4 to #N are unused in a subband #1, and beams #3 to #N are used and beams #1 and #2 are unused in a subband #M.

Block 506

The serving eNB exchanges the beam coordination information $B_i$ determined in Block 505 with the neighbor eNBi.

That is, the serving eNB transmits $B_0$ to the neighbor eNBi, and receives $B_i$ from the neighbor eNBi.

Block 507

When scheduling UEs in every Transmit Time Interval (TTI), the serving eNB may use the beam coordination information received in Block 507 from the neighbor eNBi together with its beam coordination information.

In closed-loop MIMO (Single User (SU)-MIMO and Multi User (MU)-MIMO), if the serving eNB uses a PF scheduler, the serving eNB determines beams maximizing an achievable spectral efficiency. That is, the serving eNB determines beams maximizing an SINR using Equation 5 below.

$$\gamma = \frac{\max_{v_0 \in v_0^m} \|H_{00}^m v_0\|^2}{N_0 + \sum_i E_{v_i \in v_i^m} \|H_{0i}^m v_i\|^2} \quad [\text{Eqn. 5}]$$

where $\gamma$ represents an expected SINR of a UE, $V_0$ represents a beam available by a serving eNB, $V_i$ represents a beam available by a neighbor eNBi, $V_0^m$ represents a set of beams available by a serving eNB in a subband m, $V_i^m$ represents a set of beams available by a neighbor eNBi in a subband m, $H_{00}^m$ represents a channel matrix between the serving BS and a neighbor eNB0 in the subband m, $H_{0i}^m$ represents a channel matrix between the serving BS and the neighbor eNBi in the subband m, $N_0$ represents a noise of the serving eNB, and E represents a expectation value.

The serving eNB determines beams maximizing an SINR for an arbitrary individual UE set (for example, one UE when SU-MIMO is used, and a set of two or more UEs when MU-MIMO is used). Referring to the above-described beam coordination information in Table 1, the serving eNB calculates an inner product value with an unused beam among the determined beams, and determines a distance between beams based on the calculated inner product value.

If the calculated inner product value is greater than a predetermined threshold, the serving eNB decreases a PF metric value so as not to use the pertinent beam. Then, as the related UE set has a low priority corresponding to the PF metric value decreased in the PF scheduler, the UE set is not allocated resources from the serving eNB and does not use the pertinent beam.

In contrast, when open-loop MIMO is used, the serving eNB cyclically changes beams in a given codebook to obtain diversity effects. By using the beam coordination information of the neighbor eNBi, received in Block 506, the serving eNB may switch beams cyclically, avoiding the use-restricted beams.

Next, a structure of an eNB according to an embodiment of the present invention will be described with reference to FIG. 6.

Figure 6:
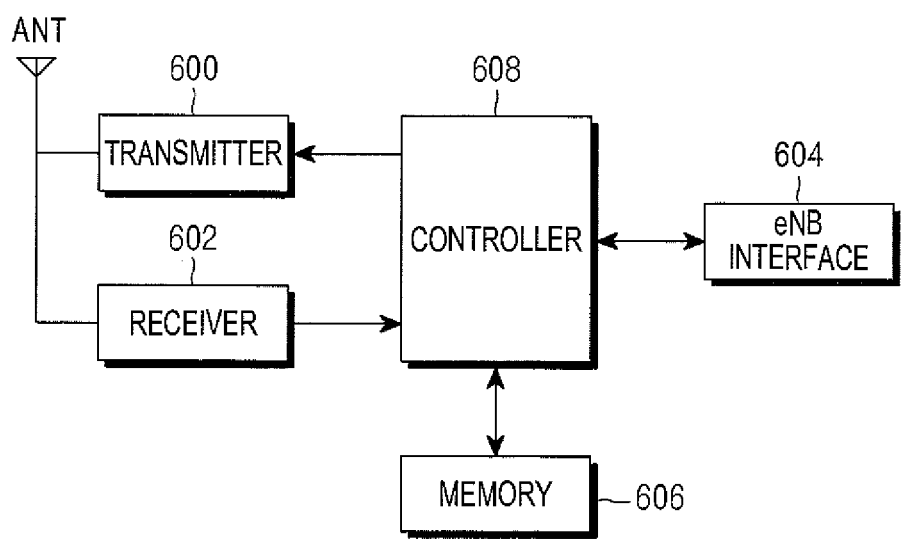
FIG. 6 is a block diagram of an eNB according to an embodiment of the present invention.

FIG. 6 illustrates a structure of an eNB according to an embodiment of the present invention.

A serving eNB or a neighbor eNBi are constructed as illustrated in FIG. 6. Only the serving eNB will be described below for convenience of description.

Referring to FIG. 6, a serving eNB includes a transmitter 600, a receiver 602, an eNB interface 604, a memory 606, and a controller 608.

The transmitter 600 and the receiver 602 perform wireless communication with a UE. The transmitter 600 transmits a signal to the UE through a downlink, and the receiver 602 receives a signal from the UE through an uplink. In particular, the receiver 602 receives, from the UE, a channel covariance matrix for a neighbor eNBi with the highest interference among a plurality of neighbor eNBs.

The eNB interface 604 provides an interface for performing communication with neighbor eNBs. The eNB interface 604 may be, for example, an X2 interface, a backhaul, and such. The eNB interface 604 exchanges interference signal power information and beam coordination information with the neighbor eNBi.

The memory 606 stores (i) messages or information to be transmitted through the transmitter 600, (ii) messages or information received through the receiver 602, (iii) information to be transmitted to the neighbor eNBs through the eNB interface 604, and (iv) information received from the neighbor eNBs. Particularly, the memory 606 stores a channel covariance matrix for the neighbor eNBi, interference signal power information of the serving eNB, and beam coordination information, all of which are received from the UE, and stores interference signal power information and beam coordination information of the neighbor eNBi, which are received from the neighbor eNBi.

The controller 608 controls the transmitter 600, the receiver 602, the eNB interface 604, and the memory 606, and controls the overall operation of the serving eNB.

The controller 608 receives a channel covariance matrix for the neighbor eNBi from a UE in its cell, and generates received signal power information for each subband-beam pair. The controller 608 generates interference signal power information for the neighbor eNBi for each subband-beam pair and exchanges the interference signal power information with the neighbor eNBi.

The controller 608 calculates an SLR based on the exchanged interference signal power information and generates beam coordination information indicating use/nonuse of each beam in each subband using the calculated SLR. After generating the beam coordination information, the controller 608 exchanges the beam coordination information with the neighbor eNBi and performs scheduling on the UE using the beam coordination information in cooperation with the serving eNB and the neighbor eNBi.

That is, the controller 608 is adapted to minimize the inter-cell interference using the scheduling process as described above with reference to blocks 501 to 507.

As is apparent from the foregoing description, the present invention can effectively control inter-cell interference through minimum information exchange between eNBs in a MIMO communication system.

Moreover, in the present invention, interference information is exchanged at intervals of a long-term period, preventing occurrence of a delay caused by transmission/reception of interference information on the backhaul, and making it possible to effectively control inter-cell interference while maintaining the existing scheduling complexity.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for performing a scheduling operation by a serving evolved node B (eNB) in a multiple-input multiple-output (MIMO) communication system, the method comprising:

receiving, from a user equipment (UE), a channel covariance matrix for the serving eNB and a channel covariance matrix for a first neighbor eNB with a highest interference among a plurality of neighbor eNBs;

generating received signal power information for each subband-beam pair;

generating a first interference signal power information for each subband-beam pair for the first neighbor eNB;

exchanging the first interference signal power information for a second interference signal power information generated by the first neighbor eNB for each subband-beam pair;

generating a first beam coordination information indicating a use status of each beam in each subband for the UE using the received signal power information and the second interference signal power information;

exchanging the first beam coordination information for a second beam coordination information generated by the first neighbor eNB;

determining available beams in each subband for the UE based on the first beam coordination information and the second beam coordination information; and determining at least one of the available beams as at least one beam to be used for the UE, wherein an inner product value between the at least one beam to be used for the UE and at least one unused beam in each subband is smaller than a predetermined value.

2. The method of claim 1, wherein exchanging the first interference signal power information for the second interference signal power information comprises exchanging the first interference signal power information for the second interference signal power information for a period longer than a period for which operation for determining at least one of the available beams is performed.

3. The method of claim 1, wherein generating the received signal power information comprises generating the received signal power information using the following equation, $$\prod_k \left( \|H_{0m}^k v_j\|^2 P_{Tx} \right)^{\frac{\phi_{km}^{(0)}}{T_k}}$$

where k represents an index of the UE, $H_{0m}^k$ represents a downlink channel matrix from the serving eNB to the UE in a subband m, $v_j$ represents a precoding vector of a j-th beam, $P_{Tx}$ represents a transmit power of the serving eNB in the subband m, $\phi_{km}^{(0)}$ represents a ratio in which the UE is allocated the subband m from the serving eNB, and $T_k$ represents a throughput of the UE.

4. The method of claim 1, wherein generating the first interference signal power information comprises generating the first interference signal power information using the following equation, $$\prod_k \left( \|H_{im}^k v_j\|^2 P_{Tx} \right)^{\frac{\phi_{km}^{(0)}}{T_k}}$$

where i represents an index of the first neighbor eNB, k represents an index of the UE, $H_{im}^k$ represents a downlink channel matrix from the first neighbor eNB to the UE in a subband m, $v_j$ represents a precoding vector of a j-th beam, $P_{Tx}$ represents a transmit power of the serving eNB in the subband m, $\phi_{km}^{(0)}$ represents a ratio in which the UE is allocated the subband m from the serving eNB, and $T_k$ represents a throughput of the UE.

5. The method of claim 1, wherein generating the first beam coordination information comprises:

calculating a Signal-to-Leakage Ratio (SLR) for each subband-beam pair based on the received signal power information and the second interference signal power information;

comparing the calculated SLR with a threshold;

determining whether each beam is to be used in each subband based on a result of the comparison; and generating the first beam coordination information using a result of the determination.

6. The method of claim 5, further comprising maximizing the calculated SLR to generate a proportional fairness (PF) metric of an entire network.

7. The method of claim 1, wherein the at least one beam is determined based on a signal-to-interference and noise ratio (SINR) calculated using the following equation, $$\gamma = \frac{\max_{v_0 \in V_0^m} \|H_{00}^m v_0\|^2}{N_0 + \sum_i \underset{v_i \in V_i^m}{E} \|H_{0i}^m v_i\|^2}$$

where γ represents an expected SINR for the UE, i represents an index of the first neighbor eNB, $v_0$ represents a beam available by the serving eNB, $v_i$ represents a beam available by the first neighbor eNB, $V_0^m$ represents a set of beams available by the serving eNB in a subband m, $V_i^m$ represents a set of beams available by the first neighbor eNB in the subband m, $H_{00}^m$ represents a channel matrix between the serving BS and a $0^{th}$ neighbor eNB in the subband m, $H_{0i}^m$ represents a channel matrix between the serving BS and the first neighbor eNB in the subband m, $N_0$ represents a noise of the serving eNB, and E represents an expectation value.

8. The method of claim 1, wherein if the MIMO communication system uses an open-loop MIMO, the available beams in each subband for the UE are periodically changed.

9. An serving evolved node B (eNB) for performing a scheduling operation in a multiple-input multiple-output (MIMO) communication system, the serving eNB comprising:

a receiver configured to receive a channel covariance matrix for the serving eNB and a channel covariance matrix for a first neighbor eNB with a highest interference among a plurality of neighbor eNBs from a user equipment (UE);

an eNB interface configured to communicate with the first neighbor eNB; and a controller configured to:

upon receipt of the channel covariance matrix for the serving eNB and the channel covariance matrix for the first neighbor eNB, generate received signal power information for each subband-beam pair, generate first interference signal power information for each subband-beam pair for the first neighbor eNB, control the eNB interface to exchange the first interference signal power information for a second interference signal power information generated by the first neighbor eNB for each subband-beam pair, generate first beam coordination information indicating a use status of each beam in each subband for the UE using the received signal power information and the second interference signal power information, control the eNB interface to exchange the first beam coordination information for second beam coordination information generated by the first neighbor eNB, determine available beams in each subband for the UE based on the first beam coordination information and the second beam coordination information, and determine at least one of the available beams as at least one beam to be used for the UE, wherein an inner product value between the at least one beam to be used for the UE and at least one unused beam in each subband is smaller than a predetermined value.

10. The serving eNB of claim 9, wherein the controller is configured to exchange the first interference signal power information for the second interference signal power information for a period longer than a period for which operation for determining at least one of the available beams is performed.

11. The serving eNB of claim 9, wherein the controller is configured to generate the received signal power information using the following equation, $$\prod_k (\|H^k_{0m} v_j\|^2 P_{Tx})^{\frac{\phi^{(0)}_{km}}{T_k}}$$

where k represents an index of the UE, $H_{0m}^k$ represents a downlink channel matrix from the serving eNB to the UE in a subband m, $v_j$ represents a precoding vector of a j-th beam, $P_{Tx}$ represents a transmit power of the serving eNB in the subband m, $\phi_{km}^{(0)}$ represents a ratio in which the UE is allocated the subband m from the serving eNB, and $T_k$ represents a throughput of the UE.

12. The serving eNB of claim 9, wherein the controller is configured to generate the first interference signal power information using the following equation, $$\prod_k (\|H^k_{im} v_j\|^2 P_{Tx})^{\frac{\phi^{(0)}_{km}}{T_k}}$$

where i represents an index of the first neighbor eNB, k represents an index of the UE, $H_{im}^k$ represents a downlink channel matrix from the first neighbor eNB to the UE in a subband m, $v_j$ represents a precoding vector of a j-th beam, $P_{Tx}$ represents a transmit power of the serving eNB in the subband m, $\phi_{km}^{(0)}$ represents a ratio in which the UE is allocated the subband m from the serving eNB, and $T_k$ represents a throughput of the UE.

13. The serving eNB of claim 9, wherein the controller is configured to calculate a signal-to-leakage ratio (SLR) for each subband-beam pair based on the received signal power information and the second interference signal power information, compare the calculated SLR with a threshold, determine whether each beam is to be used in each subband based on a result of the comparison, and generate the first beam coordination information using a result of the determination.

14. The serving eNB of claim 13, wherein the controller is configured to maximize the calculated SLR to generate a proportional fairness (PF) metric of an entire network.

15. The serving eNB of claim 9, wherein the at least one beam is determined based on a signal-to-interference and noise ratio (SINR) calculated using the following equation, $$\gamma = \frac{\max_{v_0 \in V_0^m} \|H_{00}^m v_0\|^2}{N_0 + \sum_i E_{v_i \in V_i^m} \|H_{0i}^m v_i\|^2}$$

where γ represents an expected SINR for the UE, i represents an index of the first neighbor eNB, $v_0$ represents a beam available by the serving eNB, $v_i$ represents a beam available by the first neighbor eNB, $V_0^m$ represents a set of beams available by the serving eNB in a subband m, $V_i^m$ represents a set of beams available by the first neighbor eNB in the subband m, $H_{00}^m$ represents a channel matrix between the serving BS and a $0^{th}$ neighbor eNB in the subband m, $H_{0i}^m$ represents a channel matrix between the serving BS and the first neighbor eNB in the subband m, $N_0$ represents a noise of the serving eNB, and E represents an expectation value.

16. The serving eNB of claim 9, wherein, if the MIMO communication system uses an open-loop MIMO, the available beams in each subband for the UE are periodically changed.

17. A serving evolved node B (eNB) in a multiple-input multiple-output (MIMO) communication system, the serving eNB comprising:

a receiver configured to receive signals from a user equipment (UE);

an eNB interface configured to communicate with a plurality of neighbor eNBs; and a controller communicatively coupled to the receiver and the eNB interface, the controller configured to:

generate received signal power information for each subband-beam pair, determine a first neighbor eNB with a highest interference among the plurality of neighbor eNBs based on a signal received from the UE, generate a first interference signal power information for the first neighbor eNB for each subband-beam pair, exchange the first interference signal power information with the first neighbor eNB to receive a second interference signal power information generated by the first neighbor eNB for each subband-beam pair, generate first beam coordination information indicating a beam use status for each beam in each subband for the UE using the received signal power information and the second interference signal power information, exchange the first beam coordination information with the first neighbor eNB to receive second beam coordination information generated by the first neighbor eNB, determine available beams in each subband for the UE based on the first beam coordination information and the second beam coordination information, and determine at least one of the available beams as at least one beam to be used for the UE, wherein an inner product value between the at least one beam to be used for the UE and at least one unused beam in each subband is smaller than a predetermined value.

18. The serving eNB of claim 17, wherein the controller is configured to generate the received signal power information using the following equation, $$\prod_k \left( \|H_{O_m}^k v_j\|^2 P_{Tx} \right)^{\frac{\phi_{km}^{(0)}}{T_k}}$$

where k represents an index of the UE, $H_{O_m}{}^k$ represents a downlink channel matrix from the serving eNB to the UE in a subband m, $v_j$ represents a precoding vector of a j-th beam, $P_{Tx}$ represents a transmit power of the serving eNB in the subband m, $\phi_{km}^{(0)}$ represents a ratio in which the UE is allocated the subband m from the serving eNB, and $T_k$ represents a throughput of the UE.

19. The serving eNB of claim 17, wherein the controller is configured to generate the first interference signal power information using the following equation, $$\prod_k \left( \|H_{im}^k v_j\|^2 P_{Tx} \right)^{\frac{\phi_{km}^{(0)}}{T_k}}$$

where i represents an index of the first neighbor eNB, k represents an index of the UE, $H_{im}$ represents a downlink channel matrix from the first neighbor eNB to the UE in a subband m, $v_j$ represents a precoding vector of a j-th beam, $P_{TX}$ represents a transmit power of the serving eNB in the subband m, $\phi_{km}^{(0)}$ represents a ratio in which the UE is allocated the subband m from the serving eNB, and $T_k$ represents a throughput of the UE.

20. The serving eNB of claim 17, wherein the controller is configured to calculate a signal-to-leakage ratio (SLR) for each subband-beam pair based on the received signal power information and the second interference signal power information, compare the calculated SLR with a threshold, determine whether each beam is to be used in each subband based on a result of the comparison, and generate the first beam coordination information using a result of the determination.

* * * * *